Sept. 24, 1957 L. A. HOWARD 2,807,414

CARD ANALYZER

Filed June 11, 1952 4 Sheets-Sheet 1

INVENTOR
LOUIS A. HOWARD
BY John P. Dority
ATTORNEY

INVENTOR
LOUIS A. HOWARD
BY John P. Doxity
ATTORNEY

Sept. 24, 1957 L. A. HOWARD 2,807,414

CARD ANALYZER

Filed June 11, 1952 4 Sheets-Sheet 3

INVENTOR
LOUIS A. HOWARD
BY John P. Derity
ATTORNEY

CARD ANALYZER

INVENTOR
LOUIS A. HOWARD
BY John P. Sinity
ATTORNEY

United States Patent Office 2,807,414

Patented Sept. 24, 1957

2,807,414

CARD ANALYZER

Louis A. Howard, United States Navy, assignor to International Business Machines Corporation, New York, N. Y., a corporation of New York Application June 11, 1952, Serial No. 293,018

7 Claims. (Cl. 235—61.11)

Figure 1:
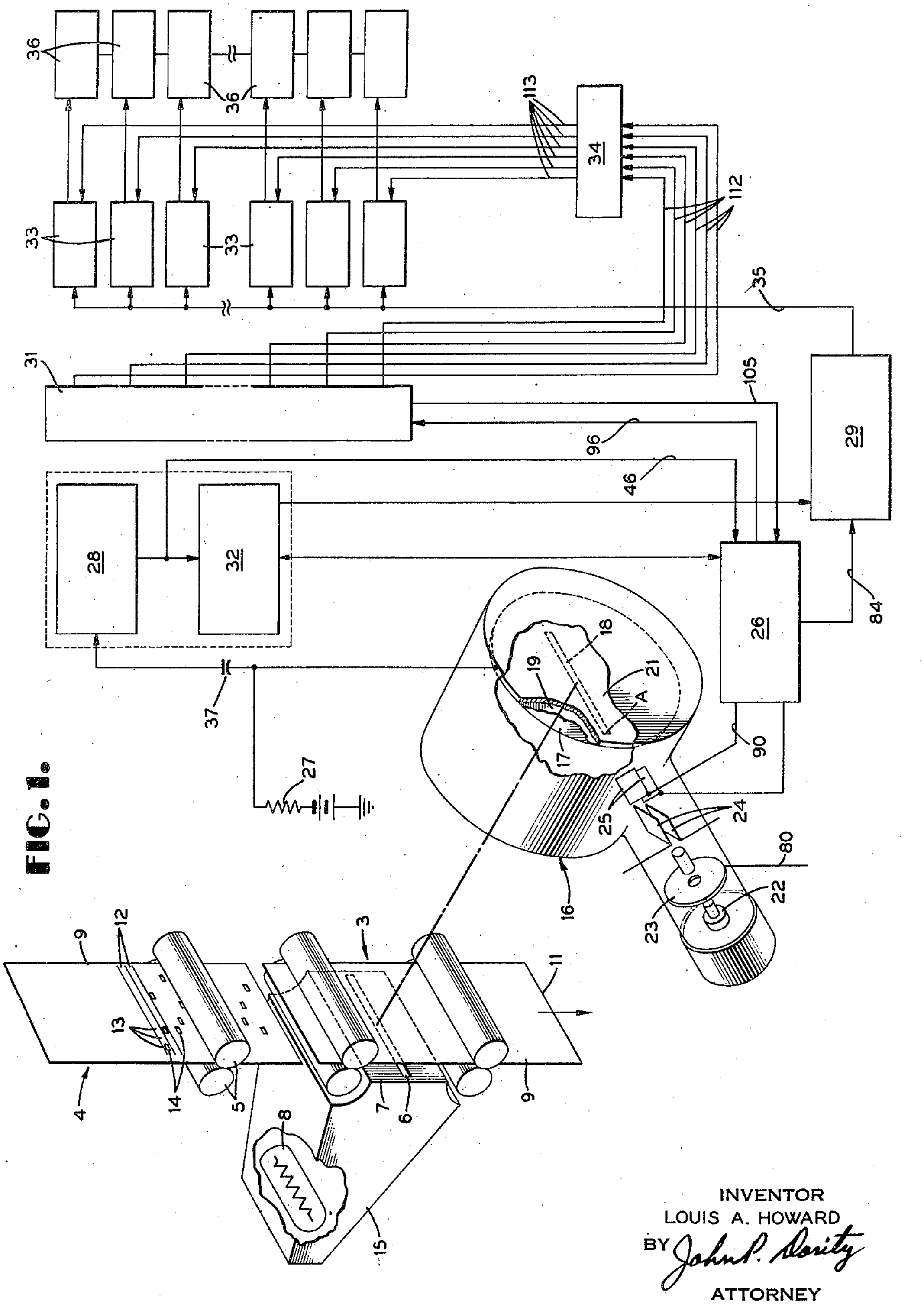

This invention relates to record controlled statistical machines, and more particularly to improved mechanism in such machines for reading data from a continuously moving array of record cards.

An object of this invention is to provide improved means for producing electrical manifestations of data from representations of data stored in record cards.

Another object of this invention is to provide improved means for relating electrical manifestations of data produced from representations of data stored in record cards to time indices.

Still another object of this invention is to provide an improved pulse analyzer.

A further object of this invention is to provide improved means for performing an individual reading operation on each card of a continuously moving array of record cards.

A more particular object of this invention is to provide means for initiating an individual reading operation on each card of a continuously moving array of record cards in response to a signal derived from the leading edge of the card.

According to one embodiment of the invention a continuously moving array of record cards is passed between a light source and the screen of an iconoscope so that a signal is taken from the iconoscope each time the leading edge of a card interrupts the light falling on the screen to initiate the operation of the scanning mechanism of the iconoscope. The scanning mechanism then controls the various components of the statistical machine.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a schematic representation, partly in block form, of apparatus made in accordance with this invention.

Figure 2A:
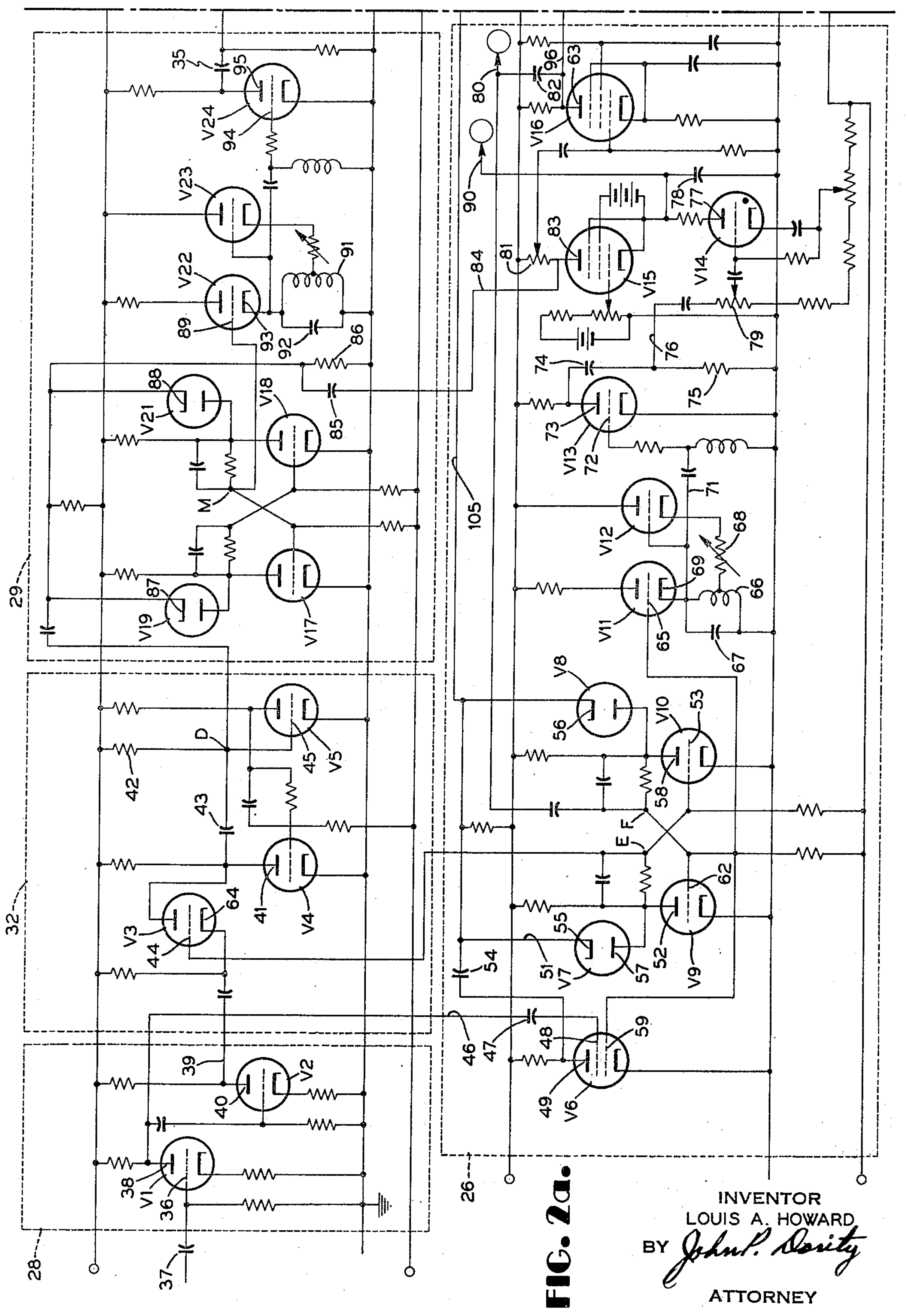
Figure 2B:
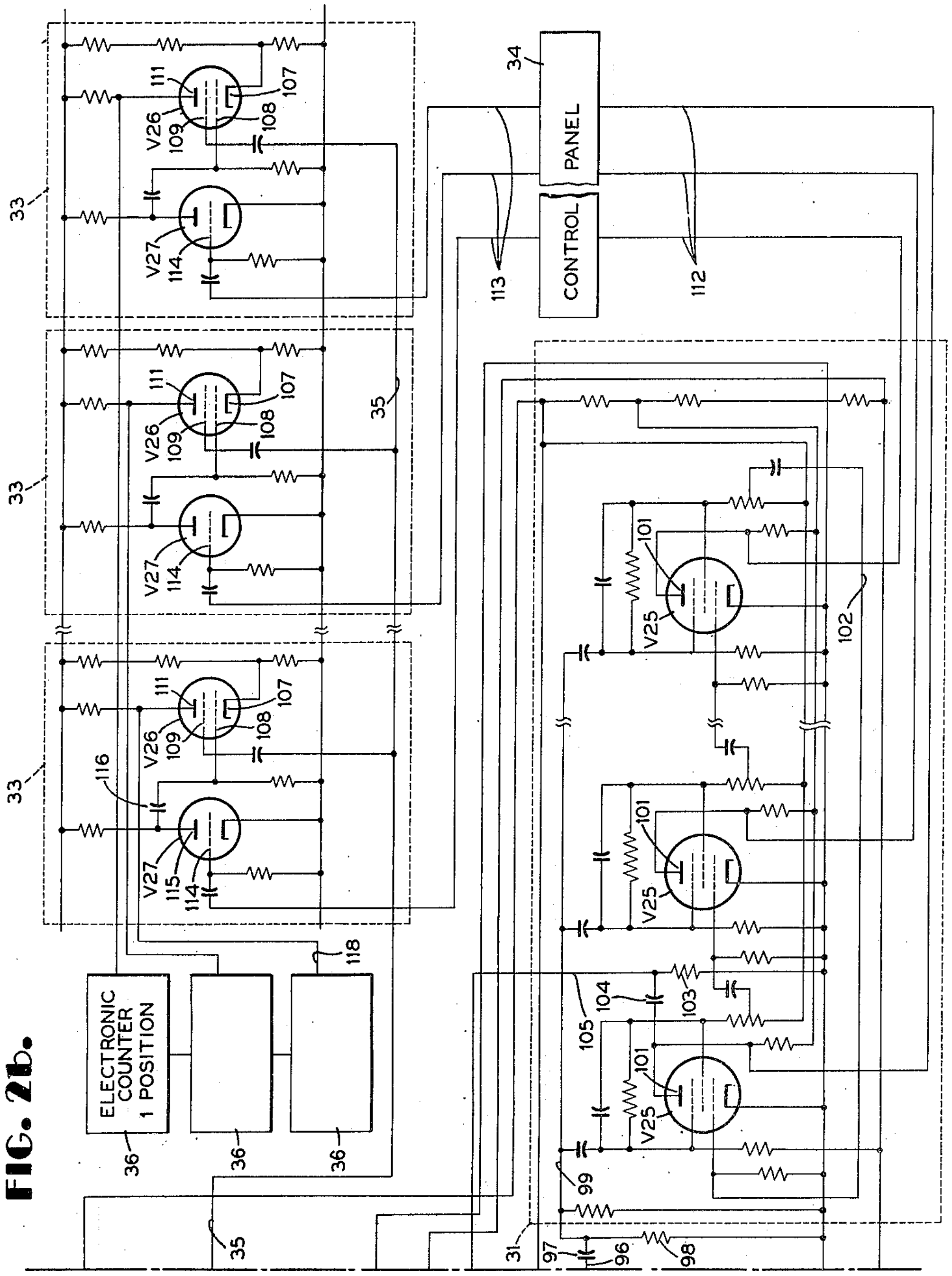

Figs. 2*a* and 2*b* are a schematic wiring diagram of the apparatus shown in Fig. 1.

Figure 3:
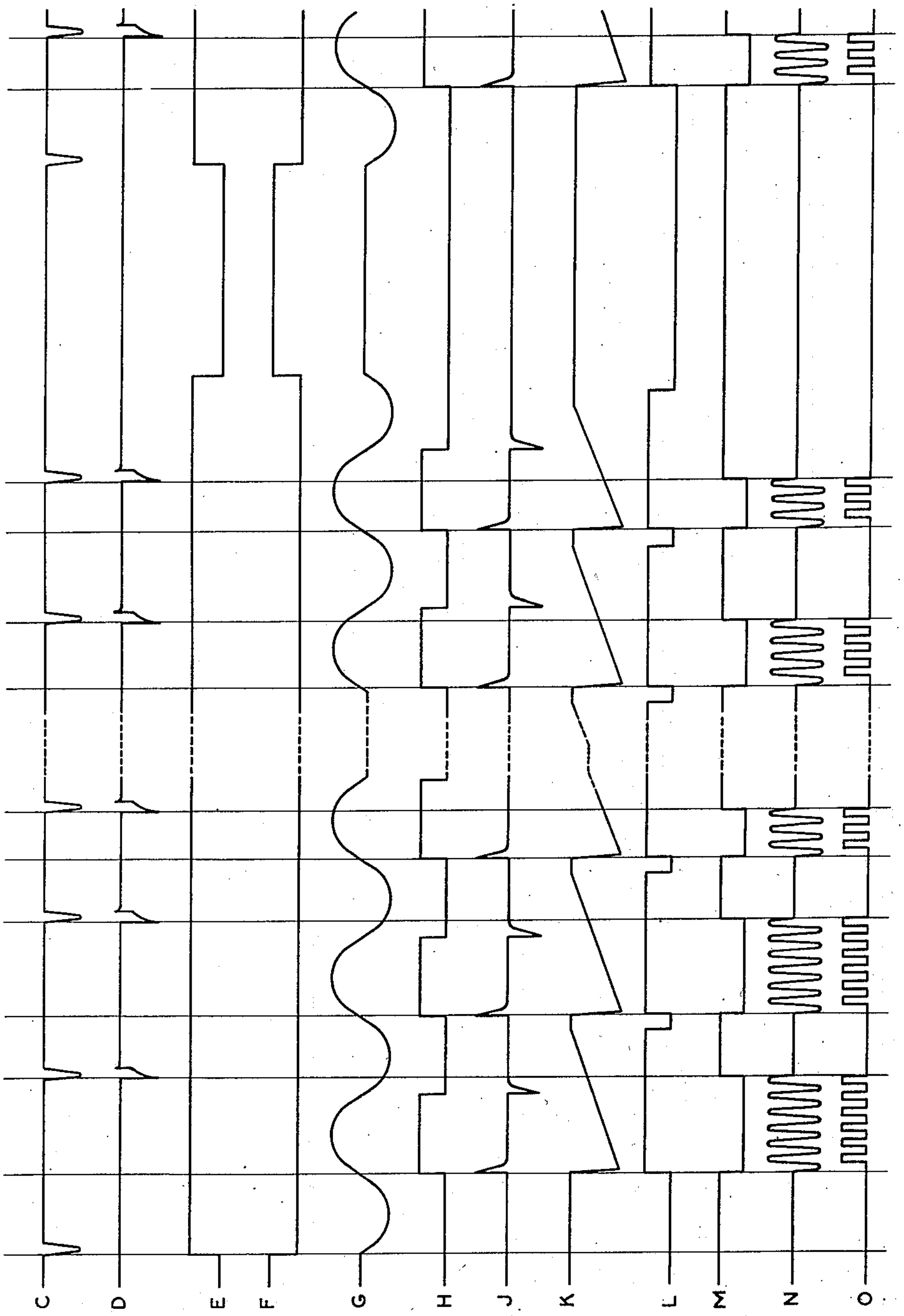

Fig. 3 is a diagrammatic representation of wave forms appearing at various points throughout the wiring diagram of Figs. 2*a* and 2*b*.

The invention will be explained by reference to an illustrative embodiment incorporating an iconoscope as a reading tube and electronic components for carrying out the reading and relating functions.

THE SYSTEM AS A WHOLE

Referring to Fig. 1, an array of record cards 4 is fed by means of feed rolls 5 through a reading station 3 past an aperture 6 formed in a ground glass plate 7 behind which is placed a source of light 8. Each of the individual cards 9 of this array has a leading edge 11 with columns 12 of index points 13 disposed parallel thereto for containing representations of data in the form of perforations or transparent areas 14. The location of the perforations or transparent areas determines the value of the data represented.

The size and shape of the aperture 6 is such that only one column 12 of a card will be illuminated at one time. As shown the cards pass close to the aperture, thus, the aperture is made approximately the size of a card column. A light tight box 15 encloses the light source 8 so that only light passing through the aperture 6 reaches the array of cards. The cards of the array are spaced apart at random and are continuously advanced across the aperture by the feed rolls 5 in the direction of the arrow.

A reading tube shown here as an electron discharge device of the iconoscope type is positioned to receive the light from the aperture 6 as modified by the cards 9 in their movement. Light passing through the aperture is projected to the screen 17 of the reading tube or iconoscope 16 to form an image of the column of the card appearing in front of the aperture. The effective area of the screen 17 of the iconoscope is composed of a narrow band of light sensitive material 18 on an insulating film 19 backed by a conductive plate or output electrode 21. This band of light sensitive material 18 corresponds in shape to the shape of the aperture 6.

The iconoscope is provided with an electron gun 22 for projecting a focused beam of electrons to the screen 17, a grid 23 to control the intensity of the beam, vertical deflecting plates 24 to position the beam of electrons to impinge on the narrow band of light sensitive material 18, and horizontal deflecting plates 25 to deflect the beam of electrons along the narrow band of light sensitive material.

When no card is in front of the aperture 6 all the light from the source 8 passing through the aperture falls on the screen of the iconoscope. During this time the horizontal deflecting plates 25, under the control of a scanning and blanking circuit 26, hold the beam of electrons to impinge on the screen at a point A lying within the area illuminated by the light from the light source. As the leading edge 11 of a card 9 crosses the aperture 6, light to the screen 17 is cut off. In response to this change in illumination of the screen a signal is produced at the output electrode 21 of the iconoscope across a resistor 27 thus sensing the entry of a card into the reading station 3. This signal is taken to an amplifier 28 where it is amplified and fed to trigger the scanning and blanking circuit 26 into operation. After being triggered into operation the scanning and blanking circuit operates independently to control the various components of the statistical machine during the reading of an entire card.

The scanning and blanking circuit produces a saw tooth voltage wave form which is applied to the horizontal deflecting plates 25 of the iconoscope to successively sweep the beam of electrons through the narrow band of light sensitive material 18. The frequency of the saw tooth wave form is such that one saw tooth wave occurs during each interval that a column 12 of a card 9 is crossing the aperture 6. Thus, as each column of a card modifies the light falling on the screen 17, the beam of electrons is swept across the screen to develop a data indicative signal at the output electrode 21 as the beam of electrons strikes an area of the screen illuminated by light passing through a perforation 14 in the column 12. A blanking voltage is developed and applied to the grid 23 of the inconoscope to blank the beam of electrons during its fly-back time.

Signals are taken from the scanning and blanking circuit 26 to synchronize the operation of the various components of the statistical machine. A pulse generator 29 is triggered into operation at the beginning of the rise of each saw tooth scanning voltage to initiate the generation of time indices or index pulses simultaneously with the beginning of each sweep of the beam of electrons across the screen. An electronic commutator 31 having one position for each column 12 of a card 9 of the array is advanced one position by a signal from the scanning and blanking circuit at the end of each sweep of the beam of electrons so that the position of the commutator corresponding to the column 12 of the card appearing in front of the aperture 6 is active or on during the sweep of the beam of electrons through the image of that column. A shaping circuit 32 is conditioned by a voltage gate from the scanning and blanking circuit 26 so that it may operate only during the time that the scanning and blanking circuit is in operation. A number of electronic gates 33 equal to the number of positions of the commutator are connected to the commutator, one to each position, through a control panel 34. As successive positions of the commutator are turned on successive gates are opened so that the gate 33 corresponding to the column 12 of a card modifying the light falling on the screen 17 will be open during the time the beam of electrons is swept through the image of that column.

As a card is fed past the aperture 6 the beam of electrons is swept across the screen each time a column 12 of the card 9 passes in front of the aperture. When the beam of electrons strikes an area of the screen 17 illuminated by light passing through a perforation 14 in a column 12 a signal is produced at the output electrode 21 of the iconoscope and fed to the amplifier 28. This signal is thus indicative of the value represented by the perforation. The amplified signal from the amplifier is fed to the shaping circuit 32 and since the shaping circuit was conditioned by the scanning and blanking circuit to operate a shaped signal output is produced. The amplifier 28 and shaper circuit 32 serve to amplify and shape the signal from the iconoscope 16. The signal from the shaper circuit is fed to the pulse generator 29 to terminate its operation. Since the pulse generator began generating index pulses as the sweep of the beam of electrons across the screen began and ceased to generate index pulses in response to the signal derived from a perforation in a column the number of index pulses generated is indicative of the position of the perforation in the column and thus of the value represented by the perforation.

The output index pulses from the pulse generator are fed over a common lead 35 to all the electronic gates 33, however, only the electronic gate open under the control of the commutator 31 will pass the index pulses. The open gate corresponds to the column of the card from which the signal was derived to stop the pulse generator, thus, the column of the card containing the perforation from which the signal was derived is identified by the gate 33 passing the index pulses and the value represented by the perforation is indicated by the number of index pulses passing through the open gate. Electronic counters 36 may be connected to the electronic gates 33 to receive the index pulses passing therethrough and thus store the data read from the record cards 9.

As the electronic commutator 31 is advanced through its last position a signal is fed back to the scanning and blanking circuit 26 to terminate its operation. The electron beam is then unblanked and held to impinge at the point A on the screen until the leading edge 11 of the next card 9 of the array 4 crosses the aperture 6 at which time the above-described operation is repeated.

*Amplifier and shaper circuits*

Electronic components as employed in one embodiment of this invention to carry out the reading and relating functions are illustrated schematically in Figs. 2*a* and 2*b*. Diagrammatic wave forms occurring at various points throughout the circuits are illustrated in Fig. 3.

The amplifier circuit 28 includes tubes V1 and V2 shown diagrammatically as triodes. Tube V1 has its grid 36 coupled by a condenser 37 to the output electrode 21 of the inconoscope 16. As the leading edge 11 of a card 9 interrupts the light falling on the screen 17 of the inconoscope a negative signal is applied to the grid 36 of tube V1, amplified and taken from the plate 38 as a positive signal to trigger the scanning and blanking circuit 26 into operation. This initiates an individual reading operation on the card. When the beam of electrons is swept through an area of the screen illuminated by light passing through a perforation 14 in a card a negative signal is applied to the grid 36 of tube V1, amplified and taken from the plate 38 as a positive signal and applied to the grid of tube V2 to produce a negative signal at the plate 40 of tube V2. This negative signal is fed to trigger the shaper circuit 32. The voltage wave form appearing at the plate of tube V2 is shown diagrammatically as C in Fig. 3. The first negative signal indicates the beginning of a reading operation while the negative signals occurring during the reading operation indicate the positions of perforations in the card and thus the values of the data represented by the perforations.

The shaper circuit 32 includes tubes V3, V4 and V5 of which tubes V4 and V5 are components of a basic plate-to-grid coupled monostable multivibrator also known as a "one-shot multivibrator." This multivibrator has a stable state when tube V5 is on and tube V4 is off and a quasi-stable state when tube V5 is off and tube V4 is on. The multivibrator may be changed from the stable state to the quasi-stable state by applying a negative pulse to the plate 41 of tube V4, but the multivibrator always returns to the stable state from the quasi-stable state in a time determined by the value of the resistor 42 and condenser 43. The negative signals appearing at the plate 40 of tube V2 as a result of perforations in a card are taken over lead 39 through triode V3 and injected at the plate 41 of tube V4 to change the condition of the multivibrator from the stable state to the quasi-stable state each time a signal resulting from a perforation occurs. Triode V3 is biased beyond cut-off by a negative voltage gate applied to its grid 44 by the scanning and blanking circuit 26 during the intervals that the scanning and blanking circuit is inoperative, thus preventing triggering of the multivibrator by the signal derived from the leading edge of a card. The voltage wave form at point D on the coupling from the plate 41 of tube V4 to the grid 45 of tube V5 is shown diagrammatically as D in Fig. 3. The negative going portions of this wave form have sharp leading edges suitable for triggering the pulse generator 29 as will be explained later.

*Scanning and blanking circuit*

The scanning and blanking circuit 26 includes tube V6 serving in a gate circuit, tubes V7, V8, V9 and V10 as components of a basic plate-to-grid coupled bistable multivibrator, tubes V11 and V12 as components of a pulsed Hartley oscillator, tube V13 as the tube component of an amplifying and clipping circuit, and tubes V14, V15, and V16 as components of a linear sweep and unblanking circuit.

The positive signal appearing at the plate 38 of tube V1 in response to the leading edge 11 of a card 9 interrupting the light falling on the screen 17 of the iconoscope is applied over lead 46 through a condenser 47 to the screen grid 48 of tube V6. Tube V6 at this instant is so biased that it may conduct and the positive signal applied to the screen grid 48 will appear on the plate 49 as a negative signal. The negative signal from the plate 49 is taken over lead 51 to trigger the bistable multivibrator circuit which includes tubes V7, V8, V9 and V10. The operation of this circuit depends upon the fact that a stable condition can exist with either tube V9 on and tube V10 off or with tube V9 off and tube V10 on, and that a rapid change from one condition to the other can be initiated by suitably injecting a trigger pulse into the circuit. Initially, with tube V9 on, its plate 52 is at a sufficiently negative potential to hold the grid 53 of tube V10 at a voltage to maintain tube V10 non-conductive. The negative signal appearing at the plate 49 of tube V6 in response to the leading edge of a card crossing the aperture 6 is taken over the lead 51 through a condenser 54 and applied to the cathodes 55 and 56 of the diodes V7 and V8. The plate 57 of diode V7 is so far negative with respect to its cathode as a result of tube V9 being conductive that the negative signal applied to the cathode 55 of tube V7 does not render it conductive to pass the negative signal to the plate of tube V9. However, with tube V10 off, diode V8 will become conductive in response to the negative signal appearing on its cathode 56 and pass the negative signal to the plate 58 of tube V10. This signal will cause the multivibrator to rapidly reverse its state of stability turning tube V9 off and tube V10 on. Each negative signal appearing at the cathodes 55 and 56 of diodes V7 and V8 reverses the state of stability of the multivibrator, thus producing voltage gates on the plate-to-grid couplings between tube V9 and V10. The duration of these voltage gates depends on the intervals between successive negative triggering signals applied to the cathodes 55 and 56 of diodes V7 and V8. A diagrammatic representation of the wave form of the voltage gates at point E on the coupling between the plate of tube V9 and the grid of tube V10 is shown at E in Fig. 3, and that at point F on the coupling between the plate of tube V10 and the grid of tube V9 is shown at F. The control grid 59 of tube V6 is connected by a lead 61 to the grid 62 of tube V9 so that with the initial condition of tube V9 conducting tube V6 is also conductive and will pass the signal appearing on the screen grid 48. However, when the state of stability of the multivibrator is reversed the negative voltage gate from point F is applied to the control grid 59 of tube V6 to prevent any further signals appearing on its screen grid 48 being passed to its plate 49. The multivibrator is returned to its initial state of stability by a negative signal from the last position of the commutator.

The voltage gate from point E is applied to the grid 44 of tube V3 to condition tube V3 so that it may conduct in response to a negative signal applied to its cathode 64 from the amplifier 28 when tube V10 is conductive and bias tube V3 so that it will not conduct when tube V10 is off.

The negative voltage gates appearing at point F on the plate-to-grid coupling between tube V10 and tube V9 are also applied to the grid 65 of tube V11 of the pulsed Hartley oscillator. These negative gates pulse the pulsed Harley oscillator into oscillation at a frequency determined by the values of the inductance 66 and condenser 67 of the tank circuit and for durations determined by the length of the negative voltage gates. The values of inductance 66 and condenser 67 are such that the oscillator will oscillate at the same frequency as columns 12 of a card pass the aperture 6. Variable resistor 68 may be adjusted to give an oscillation of constant amplitude. The output of the pulsed Hartley oscillator is taken from the cathode 69 of tube V11 as a sine wave, shown diagrammatically as G in Fig. 3, and fed over lead 71 to the grid 72 of tube V13 of the amplifier and clipper circuit. A substantially square wave, shown as H in Fig. 3, is taken from the plate 73 of tube V13 and differentiated by the condenser 74 and resistor 75 network to give pulses of short duration with sharp leading edges, represented at J in Fig. 3. These pulses are fed over lead 76 to the input of the linear sweep and unblanking circuit. Initiation of action of the linear sweep and unblanking circuit is afforded by the bias arrangement for the control grid 77 of gas triode V14. In the waiting condition condenser 78 is charged. When a signal of positive polarity is received at the grid 77 of tube V14, tube V14 fires and condenser 78 is discharged suddenly through that tube, and then re-charged at a constant rate through the constant current tube V15, producing both a linear sweep voltage across the condenser 78 as shown at K in Fig. 3 and a square unblanking pulse shown as L; the circuit is then back to the waiting position. The linear sweep voltage is taken from the condenser 78 over lead 90 to the horizontal plates 25 of the iconoscope to sweep the beam of electrons across the screen. The magnitude of the linear sweep voltage is such that the beam of electrons is swept from one edge of an image of a column 12 on the screen 17 to the other edge of the image where the beam comes to rest at point A on the screen. From the above it may be seen that the data indicative signals shown at C in Fig. 3 may occur only during the interval that the linear sweep voltage is rising.

A fixed bias is applied to the grid of tube V14 by means of resistor 79. This bias is so adjusted that the tube V14 will fire when, and only when, a positive pulse is applied to the tube's control grid 77.

A square voltage pulse is produced by the potential drop across resistor 81 which is in series with the charge circuit of the sweep capacitor 78. Current flows through the resistor 81 only while condenser 78 is being charged, and the current at these times is held to a constant value by tube V15. The resulting square pulse is amplified and made positive in polarity by a voltage amplifier V16. The magnitude of the unblanking pulse is controlled by varying resistor 81. The square wave output L from the plate 63 of tube V16 is fed through condenser 82 and over lead 80 to the grid 23 of the iconoscope 16. The grid 23 of the iconoscope is coupled to the point F on the plate-to-grid coupling between tube V10 and tube V9 so that it is held at a negative bias during the time a card 9 is passing in front of the aperture 6 and the scanning and blanking circuit is in operation, and at a positive bias when no card is in front of the aperture. The unblanking pulses from the output of tube V16 remove the negative bias during the charge of condenser 78 so that during the linear sweep the negative bias on the grid 23 of the iconoscope is removed.

The operation of the scanning and blanking circuit is thus initiated by a signal from the output electrode of the iconoscope when the leading edge of a card interrupts the light falling on the iconoscope screen. Scanning and blanking voltages are thereafter produced at intervals determined by the frequency of oscillation of the pulsed Hartley oscillator until the operation of the scanning and blanking circuit is terminated by a signal from the commutator as the commutator is advanced through its last position.

*Pulse generator*

The pulse generator 29 is composed of a basic plate-to-grid coupled bistable multivibrator which includes tubes V17, V18, V19 and V21, a pulsed Hartley oscillator which includes tubes V22 and V23, and an amplifier clipper circuit which includes tube V24.

The bistable multivibrator in the pulse generator 29 may be identical to the bistable multivibrator used in the scanning and blanking circuit 26. In the initial condition, of this multivibrator, tube V17 is off and tube V18 on. Negative pulses are taken from the plate 83 of tube V15 of the scanning and blanking circuit over lead 84, differentiated by a condenser 85 and resistor 86 and applied to the cathodes 87 and 88 of the diodes V19 and V21 to reverse the state of stability of the multivibrator. These negative pulses are produced simultaneously with the linear sweep voltages so that the negative signals derived from differentiating the negative pulses occur at the beginning of the linear sweep voltage. Thus, as each linear sweep voltage begins, tube V18 of the multivibrator is turned on and tube V17 is turned off. During the rise of the linear sweep voltage a signal derived from a perforation in a card is taken from the output electrode 21 of the iconoscope, amplified, shaped, and applied as a negative going signal to the cathodes 87 and 88 of diodes V19 and V21 to return the bistable multivibrator to its initial condition. A negative voltage gate is thus produced at the point M on the plate-to-grid coupling between tubes V18 and V17 of a duration equal to the interval between successive negative signals applied to the cathodes 87 and 88 of diodes V19 and V21. A diagrammatic representation of the wave form at point M is shown as M in Fig. 3. This negative voltage gate is applied to the grid 89 of tube V22 of the pulsed Hartley oscillator to cause the oscillator to oscillate for the duration of the negative gate. This pulsed Hartley oscillator is of the same type as that used in the scanning and blanking circuit except that the components of the tank circuit, inductance 91 and condenser 92, are of proper values to give the desired frequency of oscillation. This frequency of oscillation is the same as the rate at which the linear sweep voltage sweeps the beam of electrons across images of index points on the screen 17 of the iconoscope 16. The output of this pulsed Hartley oscillator is taken from the cathode 93 of tube V22 as a sine wave, shown as N in Fig. 3, applied to the grid 94 of tube V24, amplified and clipped, and taken from the plate 95 of tube V24 as a series of substantially square wave index pulses shown as 0 in Fig. 3. One positive square wave index pulse occurs for each oscillation of the pulsed Hartley oscillator so that the number of positive index pulses produced is indicative of the number of images of index points swept through by the beam of electrons during the negative voltage gate appearing at point M.

*Commutator*

The electronic commutator 31 used in this invention may be a ring circuit of the Overbeck type described in Patent No. 2,404,918 issued July 30, 1946, to W. P. Overbeck. The positive unblanking voltage pulse L at the plate 63 of tube V16 of the scanning and blanking circuit is taken over lead 96 and differentiated by the condenser 97 and resistor 98 in Fig. 2*b* to give a negative trigger pulse at the end of the rise of each linear sweep voltage. These trigger pulses are taken over lead 99 to all positions of the commutator 31 to trigger it from one position to the next.

The commutator 31 consists of a series of positions or trigger circuits each including a tube V25 having an anode 101. Each position has two conditions of stability, namely, a first condition in which current flows to the anode 101, and a second condition in which no current flows to the anode 101, these two conditions being respectively designated the "on" and "off" conditions. Only one tube V25 of the series is in the "on" condition. Action of any trigger pulse is to convert immediately any tube V25 which is in the on condition to the off condition, that is, to destroy the first condition of stability under which the tube has been operating. This action of destroying the condition of stability generates a potential variation which is transferred to the next succeeding tube V25 in a manner to turn it on. Although only three positions of the commutator 31 are shown, the number of positions will be equal to the number of columns 12 in a card 9. The last position of the commutator is coupled back to the first position by lead 102 so that when the last position is turned off the first position will be turned on.

As a card 9 passes across the aperture 6 commutator 31 is advanced one position as each column 12 crosses the aperture. The advance from one position to the next occurs at the end of the rise of each linear sweep voltage produced in the scanning and blanking circuit 26 so that the position of the commutator 31 corresponding to the column 12 of the card 9 crossing the aperture is on during the time the column is passing the aperture. As the last position of the commutator is turned off and the first position turned on a negative gate voltage appears at the plate of the tube V25 of the first position. This negative gate voltage is differentiated by the condenser 104 and resistor 103 to produce a negative pulse at the beginning of the gate. This negative pulse is fed over a lead 105 to the cathodes 55 and 56 of diodes V7 and V8 of the scanning and blanking circuit to reverse the condition of stability of the multivibrator and terminate the operation of the scanning and blanking circuit.

The first position of the commutator will remain on until the first column 12 of the next card 9 of the array has crossed the aperture 6 at which time the commutator will be advanced to the next position.

The output of each position of the commutator is taken from the plate 101 of the respective tube V25 in the form of a negative gate voltage of the duration that the position is on.

*Gate circuit*

Each position of the commutator 31 has an individual gate circuit 33 associated with it. These gate circuits 33 each includes a tube V26 having a cathode 107, a control grid 108, a screen grid 109 and a plate 111. The control grids 108 of the tubes V26 are normally biased so far negative that any signals appearing on the screen grid 109 will not be passed.

The negative gate outputs from the commutator 31 are taken over individual leads 112 to the control panel 34. The control panel 34 enables any position of the commutator 31 to be connected to any of the electronic gate circuits 33 so that any gate circuit may be assigned to any column 12 of a card. From the control panel 34 the negative voltage gates from the commutator are taken individually over leads 113 to the grids 114 of tubes V27. The plates 115 of tubes V27 are coupled through condensers 116 to the control grids 108 of tubes V26, thus a negative gate voltage appearing at the grid 114 of tube V27 appears at the control grid 108 of the corresponding tube V26 as a positive voltage gate. The positive voltage gate on the grid 108 of a tube V26 removes the negative bias and conditions the tube V26 so that signals appearing on its screen grid 109 will be passed. Thus, during the time that one position of the commutator 31 is on, the corresponding electronic gate 33 is open. Since only one position of the commutator is on at one time only one electronic gate is open at one time.

The output of the pulse generator 29 is taken from the plate 95 of tube V24 and applied over a common lead 35 to the screen grids 109 of all the tubes V26 of the electronic gate circuits 33. Only the open gate will pass the index pulses from the pulse generator 29. By the connections through the control panel 34 each gate is assigned to a specific column 12 of a card 9, and the number of index pulses passing through a gate 33 is indicative of the value represented in the corresponding column 12 of the card 9 passing the aperture. The outputs from the electronic gates may be used to control a desired operation of the statistical machine. As an example the gates 33 are shown connected to electronic counters 36 where the information read from the cards is stored. The connections to the electronic counters are made from the plates 111 of tubes V26 of the gate circuits 33 by leads 118.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for reading at a reading station each card of an array of continuously moving record cards, the combination of sensing means responsive to the leading edge of a card for emitting a signal when a card enters said reading station, reading means including deflectable scanning means for reading said cards, and means responsive to said signal for initiating an individual scanning operation of said scanning means for each card entering said reading station.

2. In a machine for reading each card of a continuously moving array of record cards each having a leading edge, the combination of an electron discharge device having a radiant energy sensitive screen and means for projecting a focused beam of electrons thereto, means for projecting a ray of radiant energy across the path of movement of said array of cards to said screen so that said cards modify said ray of radiant energy in their movement, means responsive to said beam of electrons for generating a signal when the leading edge of a card interrupts said ray of radiant energy, scanning means for scanning said screen with said beam of electrons, and means responsive to said signal for initiating operation of said scanning means.

3. In a machine for reading each card of a continuously moving array of record cards each having a leading edge, the combination of an electron discharge device having a radiant energy sensitive screen and means for projecting a focused beam of electrons thereto, means for projecting a ray of radiant energy across the path of movement of said array of cards to said screen so that said cards modify said ray of radiant energy in their movement, means responsive to said beam of electrons for generating a signal when the leading edge of a card interrupts said ray of radiant energy, scanning means for scanning said screen with said beam of electrons, means responsive to said signal for initiating operation of said scanning means, and means under the control of said scanning means for terminating operation of said scanning means after a predetermined number of scans so that said scanning means is conditioned for the succeeding card of said array.

4. In a machine for reading each card of an array of record cards each having a leading edge, the combination of an electron discharge device having a light sensitive screen and means for projecting a focused beam of electrons thereto, means for projecting a thin ray of light to said screen, means for continuously moving said array of cards leading edge first through said ray of light so that said cards will modify the light falling on said screen, means responsive to said beam of electrons for developing a signal when the leading edge of a card interrupts said ray of light, scanning means for scanning said screen with said beam of electrons, means responsive to said signal for initiating operation of said scanning means, means triggered by said scanning means at the beginning of each scan of said screen for generating index pulses at a predetermined rate, and means under the control of said scanning means for terminating operation of said scanning means after a predetermined number of scans so that said scanning means is conditioned for the succeeding card of said array.

5. In a machine for reading each card of an array of record cards each having a leading edge with columns of index points containing representations of data in the form of light transparent areas disposed parallel thereto; the combination of an electron discharge device having a light sensitive screen and means for projecting a focused beam of electrons thereto; means for projecting a ray of light on said screen to illuminate it, said ray of light corresponding in cross sectional shape to the shape of one of said columns; means for continuously moving said array of cards leading edge first through said ray of light so that said cards modify the light falling on said screen; means responsive to said beam of electrons for developing a first signal when the leading edge of a card interrupts said ray of light; scanning means for sweeping said beam of electrons across said screen as each of said columns crosses said ray of light; means responsive to said first signal for initiating operation of said scanning means; a pulse generator triggered by said scanning means at the beginning of each sweep of said beam of electrons across said screen for generating index pulses at a predetermined rate; means for developing a second signal when said beam of electrons sweeps through an area of said screen illuminated by light passing through one of said light transparent areas; means responsive to said second signal for terminating the generation of pulses by said pulse generator so that the number of pulses generated will be indicative of the value represented by said one of said light transparent areas; and means under the control of said scanning means for terminating operation of said scanning means after a predetermined number of sweeps of said beam of electrons across said screen so that said scanning means is conditioned for the succeeding card of said array.

6. In a machine for reading each card of an array of record cards each having a leading edge with a plurality of columns of index points containing representations of data in the form of light transparent areas disposed parallel thereto; the combination of an electron discharge device having a light sensitive screen and means for projecting a focused beam of electons thereto; means for projecting a ray of light on said screen to illuminate it; means for continuously moving said array of cards leading edge first through said ray of light so that said cards modify the illumination of said screen; means responsive to said beam of electrons for developing a first signal when the leading edge of a card interrupts said ray of light, scanning means for sweeping said beam of electrons across said screen once each time a column of a card passes into said ray of light; means responsive to said first signal for initiating operation of said scanning means; a pulse generator triggered by said scanning means at the beginning of each sweep of said beam of electrons for generating index pulses at a predetermined rate; means for developing a second signal when said beam of electrons sweeps through an area of said screen illuminated by light passing through one of said light transparent areas; means responsive to said second signal for terminating the generation of index pulses by said pulse generator so that the number of index pulses generated during a sweep of said beam of electrons across said screen is indicative of the value represented by said one of said light transparent areas; a plurality of electronic gates for passing said index pulses when open, each of said electronic gates corresponding to a column of a card; a commutator for selectively opening said electronic gates; means for advancing said commutator one position for each sweep of said beam of electrons across said screen so that the electronic gate corresponding to the column of a card modifying said ray of light is open to pass the index pulses from said pulse generator during the sweep of said beam of electrons across said screen; means under the control of said commutator for terminating the operation of said scanning means when said commutator is advanced through its last position so that said scanning means is conditioned for the succeeding card of said array.

7. A machine as defined in claim 1 wherein said reading means produce data indicative signals, further characterized by the provisions of a pulse generator for generating index pulses at a predetermined rate, means responsive to said reading means for initiating operations of said pulse generator, and means responsive to each of said data indicative signals for terminating operation of said pulse generator so that the number of index pulses generated is indicative of the value represented by the one of said data indicative signals effecting the termination of operation of said pulse generator.

References Cited in the file of this patent

UNITED STATES PATENTS

| | | |
|---|---|---|
| 2,020,925 | Young | Nov. 12, 1935 |
| 2,358,051 | Broido | Sept. 12, 1945 |
| 2,401,021 | Rosenberg et al. | May 28, 1946 |
| 2,480,744 | Lake et al. | Aug. 30, 1949 |